United States Patent Office 2,807,600
Patented Sept. 24, 1957

2,807,600

REINFORCEMENT OF RUBBER WITH SOLID SILICON MONOXIDE

Edwin B. Newton, Akron, Ohio, and Daniel S. Sears, Henrico County, Va., assignors to The B. F. Goodrich Company, New York, N. Y., a corporation of New York No Drawing. Application May 28, 1954,
Serial No. 433,291

24 Claims. (Cl. 260—41.5)

This invention is concerned with the reinforcement of rubbery materials. In particular, this invention is concerned with the reinforcement of rubbery materials with silicon monoxide.

Carbon blacks are generally employed in rubbery compositions to afford reinforcement of the rubber as well as to act as an extender. However, carbon blacks are expensive and the supply of raw material from which they are made is diminishing.

Accordingly, it is a primary object of this invention to provide an economical method for reinforcing rubbery materials with a relatively inexpensive inorganic pigment.

Another object of this invention is to provide a method for reinforcing rubbery materials by incorporating in said materials silicon monoxide as a reinforcing pigment.

A further object is to provide a rubbery composition containing silicon monoxide as a reinforcing pigment.

These and other objects and advantages of this invention will become more apparent to those skilled in the art from the following detailed description and examples.

It has now been discovered according to the present invention that silicon monoxide can readily be mixed with rubbery materials to reinforce them on vulcanization.

The silicon monoxide can be prepared by heating a mixture of sand and carbon in an arc furnace to a temperature of from about 1500 to 2000° C. or higher to form gaseous SiO which is then condensed in a vacuum or in an inert atmosphere. The resulting material is substantially fibrous, having an average fiber length of from 50 to 600 millimicrons and a surface area of from 60 to 200 square meters per gram. A minor amount of the silicon monoxide may be in the form of spherical and/or horn-like particles having an average particle size of from 5 to 200 mu. and a surface area up to 300 m.$^2$/g. It is the high temperature disproportionation product of SiO having the formula $(Si)_x \cdot (SiO_2)_y$ where $x$ and $y$ are whole numbers. Essentially spherical "monox" may be obtained by blowing the gaseous SiO as it leaves the furnace with an inert gas such as nitrogen. The particles obtained may also have a surface area of 200–300 m.$^2$/g. and an average particle size of 5–200 mu.

The silicon monoxide, which condenses as a brown smoke, must be condensed in an inert atmosphere or in a vacuum to avoid the formation of silica. In place of an arc furnace, a resistance furnace may likewise be used if the temperature is high enough. Moreover, considerable variation in the mol ratios of sand or SiO$_2$ to coke can be employed to still obtain satisfactory results, and, if desired, the coke can be replaced entirely with silicon. Methods for obtaining silicon monoxide are shown in the U. S. patents to Potter, Nos. 875,286, 875,675, 1,104,384 and in the U. S. patent to Tone, 993,913. Additional information on the production of silicon monoxide may be found in the article by Potter in "Transactions of the American Electrochemical Society," vol. XII, 1907, pages 191–228, and in copending application of Daniel S. Sears, Serial No. 433,020, entitled "Method of Making Pigment," and filed of even date herewith.

The silicon monoxide reinforcing pigment is incorporated by mixing or milling into any rubbery polymeric material capable of being reinforced with carbon blacks. Among the rubbery materials capable of reinforcement are any vulcanizable rubbers including such naturally occurring crude rubbers as caoutchouc, which is essentially a rubbery conjugated polymer of isoprene, or such synthetic rubbers as rubbery polychloroprene and rubbery polymers of the open-chain conjugated dienes having from 4 to 8 carbon atoms such as the butadine-1,3 hydrocarbons which include butadiene-1,3, isoprene, 2,3-dimethyl butadiene-1,3, 1,4-dimethyl butadiene-1,3, and the like; or the rubbery copolymers of these and similar conjugated diolefins with each other or with at least one copolymerizable monomeric material such as isobutylene, styrene, acrylonitrile, methacrylonitrile, methyl acrylate, methyl methacrylate, ethyl acrylate, ethyl methacrylate, 2-vinyl pyridine, and similar materials. The rubbers can likewise be mixed if desired. The rubbery diene polymers generally contain at least 50% by weight of the conjugated diene, preferably from 55 to 85% by weight. Terpolymers employing at least 35% diene may also be used if desired. Typical rubbers in the above groups well known to the art are Buna S, GR-S, Buna N, GR-A, neoprene, butyl and the like.

Polyacrylic vulcanizable synthetic rubbers can also be reinforced according to this invention. They are prepared by the polymerization of an acrylic acid ester or mixtures of acrylic acid esters in bulk or mass polymerization of the monomers or by the polymerization of the monomers in aqueous emulsions. They may also be prepared by the copolymerization of acrylic acid esters with about 5 to 10 percent by weight of a chlorine-containing monomer such as chloroethyl vinyl ether, acrylonitrile vinyl chloride, dichloro difluoro ethylene or styrene, in mass or aqueous emulsion polymerizations. Specific acrylic acid esters include among others ethyl acrylate, methyl acrylate, butyl acrylate, and the like. The polyacrylic synthetic rubbers are well known to the art and can be used alone or mixed with other rubbery materials such as rubbery polychloroprene, butadiene-1,3, and styrene copolymers, natural rubber, etc. in proportions of from about 80 to 20 parts by weight of polyacrylic rubber to 20 to 80 parts of diene rubber.

In reinforcing rubbery materials according to the teaching of the present invention a minor amount of the silicon monoxide is used with a major amount of the rubbery material. However, to impart optimum reinforcement to the rubbery materials, it is preferable to incorporate in said rubber from about 25 to 45% by weight of the silicon-monoxide compound where the rubber is present in an amount of from 75 to 55% by weight.

Appropriate compounding ingredients such as fillers, accelerators, vulcanizing agents, antioxidants, etc. may also be employed with the rubbery materials as is well known to those skilled in the art. Amines such as didodecyl amine, Rosin amine D, secondary coco amine may also be added to the rubbery reinforced mixtures.

The following examples will serve to illustrate the invention with more particularity to those skilled in the art:

Example I

Silica and coke in about equal mol ratios were heated in an arc furnace to a temperature of about 2000° C. to 3000° C. The gas evolving from the furnace was introduced into a steel chamber which had been evacuated to about 1 mm. Hg and which was cooled by a water spray on the outside of the chamber. The gases from the furnace condensed to form a brown deposit which, when examined under an electron microscope, exhibited a particle size of about 57 mu. and a surface area of about 85 m.²/g. Over 50% of the particles were fibrous in shape and the balance exhibited a spherical and/or horn-like structure, that is, a head connected to a short tail. The brown deposit was then mixed with natural rubber in the following recipe and vulcanized. After vulcanization, tests were conducted on the vulcanized stock and the results of the tests are also shown below.

| Components of composition: | Amount of component (parts by weight) |
|---|---|
| Natural rubber | 100 |
| Zinc oxide | 5 |
| Sulfur | 3 |
| Pine tar | 1 |
| Stearic acid | 1.5 |
| Phenal beta naphthylamine | 1 |
| 2-mercapto benzothiazole | 1 |
| Didodecylamine | 1 |
| Silicon monoxide | 70 |

| Cure at 280° F. (in minutes) | 300% modulus | Ultimate tensile, p. s. i. | Ultimate elongation, percent |
|---|---|---|---|
| 15 | 690 | 2,490 | 590 |
| 30 | 800 | 2,470 | 590 |
| 45 | 820 | 2,400 | 565 |
| 60 | 710 | 2,550 | 605 |
| 90 | 670 | 1,620 | 525 |

*Example II*

The method of preparing the silicon monoxide was the same as in Example I above and a portion of the monoxide was compounded into the following recipe which was vulcanized and tested. The ingredients of the recipe and the results on test are shown below.

| Components of composition: | Amount of component (parts by weight) |
|---|---|
| Natural rubber | 100 |
| Zinc oxide | 5 |
| Sulfur | 3 |
| Pine tar | 1 |
| Stearic acid | 1.5 |
| Phenal beta naphthylamine | 1 |
| 2-mercapto benzothiazole | 1 |
| Didodecylamine | 2 |
| Silicon monoxide | 70 |

| Cure at 280° F. (in minutes) | 300% modulus | Ultimate tensile, p. s. i. | Ultimate elongation, percent |
|---|---|---|---|
| 15 | 890 | 3,200 | 635 |
| 30 | 830 | 2,670 | 600 |
| 45 | 810 | 2,740 | 595 |
| 60 | 810 | 2,790 | 640 |
| 90 | 710 | 1,930 | 545 |

*Example III*

The method of preparing the silicon monoxide was the same as in Example I, above, and a portion of the silicon monoxide was compounded into the following recipe which was vulcanized and tested. The ingredients of the recipe and the results on test are shown below.

| Components of composition: | Amount of component (parts by weight) |
|---|---|
| Natural rubber | 100 |
| Sulfur | 3.5 |
| Stearic acid | .5 |
| Litharge | 10 |
| Silicon monoxide | 60 |

| Cure at 280° F. (in minutes) | 300% modulus | Ultimate tensile, p. s. i. | Ultimate elongation, percent |
|---|---|---|---|
| 15 | 610 | 1,890 | 565 |
| 30 | 800 | 2,250 | 540 |
| 45 | 620 | 1,600 | 565 |
| 60 | 600 | 1,580 | 590 |
| 90 | 550 | 1,290 | 565 |

*Example IV*

Silicon monoxide was produced in a manner similar to that described in Example I, above, except that the SiO gas issuing from the arc furnace was blown with nitrogen gas at a high rate. The resulting brownish silicon monoxide was essentially spherical in shape and of a particle size of about 15 mu. and a surface area of about 200 m.²/g. The silicon monoxide was then mixed with GR–S rubber in the following recipes and cured. The values obtained on testing the cured samples are also shown below.

| | Compound "A" amount of component (parts by weight) | Compound "B" amount of component (parts by weight) |
|---|---|---|
| Components of compound: | | |
| 77–23 butadiene-1,3-styrene copolymer (low temp.) | 100 | 100 |
| Silicon monoxide | 70 | 50 |
| Zinc oxide | 5 | 5 |
| Stearic acid | 1.5 | 1.5 |
| Santocure (N-hexyl-2-mercapto benzothiazole sulfene amide) | 3 | 3 |
| Sulfur | 3.5 | 3.5 |
| Didodecyl amine | 3 | 3 |

| | Compound "A" | Compound "B" |
|---|---|---|
| Data on cured compound: | | |
| Cure at 302° F. (min.), optimum | 40 | 90 |
| Modulus, 300% | 3,150 | 2,100 |
| Ultimate tensile strength, p. s. i. | 3,700 | 3,050 |
| Ultimate elongation, percent | 335 | 385 |
| Shore A hardness | 87 | 72 |

In summary, the present invention teaches that novel compositions can be prepared utilizing silicon monoxide as a reinforcing pigment for rubbery materials. The use of silicon monoxide in this fashion provides a reinforced rubber which exhibits properties similar to carbon black reinforced rubbers even though the nature and structure of the silicon monoxide are entirely different from that shown by carbon blacks. The results obtained are entirely unexpected. Silicon monoxide, thus, can readily be employed to replace the more expensive carbon blacks resulting in a considerable savings in cost. Moreover the raw material, $SiO_2$ or sand, from which silicon monoxide is produced is almost limitless in amount so that there is no foreseeable possibility of diminishing supplies. The compositions of the present invention can be used in the manufacture of belts, gloves, shoe soles, tires and the like.

What is claimed is:

1. A composition of matter comprising a major amount of a rubbery material selected from the group consisting of a rubbery homopolymer of a diene, a rubbery copolymer of a mixture of dienes, a rubbery copolymer of at least one diene and at least one copolymerizable mono-olefinic material selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable mono-olefinic material selected from the group consisting of chloroethyl vinyl ether, acrylonitrile, vinyl chloride, dichlorodifluoro ethylene, and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms and, as a reinforcing pigment for said rubbery material, a minor amount of particulate, solid silicon monoxide.

2. A composition of matter comprising from about 55 to 75% by weight of a rubbery material selected from the group consisting of a rubbery homopolymer of a diene, a rubbery copolymer of a mixture of dienes, a rubbery copolymer of at least one diene and at least one copolymerizable monoolefinic material selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monoolefinic material selected from the group consisting of chloroethyl vinyl ether, acrylonitrile, vinyl chloride, dichlorodifluoro ethylene, and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms and from about 45 to 25% by weight of solid silicon monoxide having an average particle size of from 5 to 600 millimicrons and a surface area of about 60 to 300 square meters per gram.

3. A composition of matter according to claim 2 in which said silicon monoxide is substantially fibrous.

4. A composition of matter according to claim 3 in which said rubbery material comprises natural rubber.

5. A composition of matter according to claim 3 in which said rubbery material comprises a copolymer of a major amount of butadiene-1,3 and a minor amount of styrene.

6. A composition of matter according to claim 3 in which said rubbery material comprises a copolymer of a major amount of isobutylene and a minor amount of isoprene.

7. A composition of matter according to claim 3 in which said rubbery material comprises a copolymer of a major amount of butadiene-1,3 and a minor amount of acrylonitrile.

8. A composition of matter according to claim 3 in which said rubbery material comprises polyisoprene.

9. An article of manufacture comprising a vulcanizate containing a major amount of a rubbery material selected from the group consisting of a rubbery homopolymer of a diene, a rubbery copolymer of a mixture of dienes, a rubbery copolymer of at least one diene and at least one copolymerizable monoolefinic material selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monoolefinic material selected from the group consisting of chloroethyl vinyl ether, acrylonitrile, vinyl chloride, dichlorodifluoro ethylene, and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms and, as a reinforcing pigment therefor, a minor amount of particulate, solid silicon monoxide.

10. An article of manufacture comprising a vulcanizate containing from about 55 to 75% by weight of a rubbery material selected from the group consisting of a rubbery homopolymer of a diene, a rubbery copolymer of a mixture of dienes, a rubbery copolymer of at least one diene and at least one copolymerizable monoolefinic material selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monoolefinic material selected from the group consisting of chloroethyl vinyl ether, acrylonitrile, vinyl chloride, dichlorodifluoro ethylene, and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms and from about 45 to 25% by weight of solid silicon monoxide having an average particle size of from 5 to 600 millimicrons and a surface area of about 60 to 300 square meters per gram.

11. An article of manufacture according to claim 10 in which said silicon monoxide is substantially fibrous.

12. An article of manufacture according to claim 11 in which said rubbery material comprises natural rubber.

13. An article of manufacture according to claim 11 in which said rubbery material comprises a copolymer of a major amount of butadiene-1,3 and a minor amount of styrene.

14. An article of manufacture according to claim 11 in which said rubbery material comprises a copolymer of a major amount of isobutylene and a minor amount of isoprene.

15. An article of manufacture according to claim 11 in which said rubbery material comprises a copolymer of a major amount of butadiene-1,3 and a minor amount of acrylonitrile.

16. An article of manufacture according to claim 11 in which said rubbery material comprises polyisoprene.

17. The method which comprises mixing a minor amount of particulate, solid silicon monoxide with a major amount of a vulcanizable unvulcanized rubbery material selected from the group consisting of a rubbery homopolymer of a diene, a rubbery copolymer of a mixture of dienes, a rubbery copolymer of at least one diene and at least one copolymerizable monoolefinic material selected from the group consisting of isobutylene, styrene, acrylonitrile, methacrylonitrile, methyl acrylate, methyl methacrylate, ethyl acrylate, ethyl methacrylate, and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monoolefinic material selected from the group consisting of chloroethyl vinyl ether, acrylonitrile, vinyl chloride, dichlorodifluoro ethylene, and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms and vulcanizing the resulting mixture.

18. The method which comprises mixing from about 45 to 25% by weight of finely-divided, solid silicon monoxide having an average particle size of from 5 to 600 millimicrons and a surface area of from 60 to 300 square meters per gram with from 55 to 75% by weight of a vulcanizable unvulcanized rubbery material selected from the group consisting of a rubbery homopolymer of a diene, a rubbery copolymer of a mixture of dienes, a rubbery copolymer of at least one diene and at least one copolymerizable monoolefinic material selected from the group consisting of isobutylene, styrene, acrylonitrile, methacrylonitrile, methyl acrylate, methyl methacrylate, ethyl acrylate, ethyl methacrylate and 2-vinyl pyridine, a rubbery homopolymer of an acrylic acid ester, a rubbery copolymer of a mixture of acrylic acid esters, a rubbery copolymer of a mixture of at least one acrylic acid ester and at least one copolymerizable monoolefinic material selected from the group consisting of chloroethyl vinyl ether, acrylonitrile, vinyl chloride, dichlorodifluoro ethylene, and styrene, and mixtures thereof, said diene being selected from the group consisting of open-chain conjugated diene hydrocarbons and open-chain conjugated diene hydrocarbons having one atom of hydrogen replaced with chlorine and said diene having from 4 to 8 carbon atoms to form a homogeneous appearing mixture and vulcanizing said mixture.

19. The method according to claim 18 in which said silicon monoxide is substantially fibrous.

20. The method according to claim 19 in which said rubbery material comprises natural rubber.

21. The method according to claim 19 in which said rubbery material comprises a copolymer of a major amount of butadiene-1,3 and a minor amount of styrene.

22. The method according to claim 19 in which said rubbery material comprises a copolymer of a major amount of isobutylene and a minor amount of isoprene.

23. The method according to claim 19 in which said rubbery material comprises a copolymer of a major amount of butadiene-1,3 and a minor amount of acrylonitrile.

24. The method according to claim 19 in which said rubbery material comprises polyisoprene.

References Cited in the file of this patent

UNITED STATES PATENTS 2,681,327 Brown ---------------- June 15, 1954